UNITED STATES PATENT OFFICE.

JOHN M. DONOHUE, OF ROCHESTER, NEW YORK, ASSIGNOR TO EASTMAN KODAK COMPANY, OF ROCHESTER, NEW YORK, A CORPORATION OF NEW YORK.

PROCESS OF MAKING CELLULOSE ETHERS.

1,415,023.    Specification of Letters Patent.    Patented May 9, 1922.

No Drawing.    Application filed June 9, 1921.    Serial No. 476,317.

*To all whom it may concern:*

Be it known that I, JOHN M. DONOHUE, a citizen of the United States of America, residing at Rochester, in the county of Monroe and State of New York, have invented certain new and useful Improvements in Processes of Making Cellulose Ethers, of which the following is a full, clear, and exact specification.

This invention relates to the manufacture of cellulose ethers. One object of the invention is to provide a process which will produce cellulose ethers which yield strong, flexible, transparent sheets or films. Another object of my invention is to provide an improved method of preliminarily preparing certain of the ingredients so that they co-operate properly during the etherification. Still another object of the invention is to provide a method of intimately mixing cellulose and alkali by the aid of water and then cheaply removing the excess of the latter, while providing at the same time sufficient alkali for the final etherifying reaction. Another object is to provide for the elimination of the excess of alkali solution mechanically without expensive evaporation by heat and yet at the same time fulfill all necessary requirements. Other objects will hereinafter appear.

It has been proposed to etherify cellulose by reacting on a mixture of cellulose and alkali with an etherifying agent, small amounts of water being present at the time of such reaction. Before the etherifying agent is applied to the cellulose, the latter is very thoroughly mixed with the alkali and water. One of the ways in which to incorporate the alkali sufficiently intimately is to dissolve it and soak the cellulose fibers in the solution. This treatment is some times referred to as mercerization. But the quantities of water and alkali which function best in this step are not the quantities which operate most desirably during the subsequent etherifying operation. Their relative proportions must, therefore, be adjusted between the mercerization and etherification.

In order that the solution may properly contact with all of the cellulose fibers, a large amount of it is necessary, and its concentration during mercerization is limited, because too strong solutions may injuriously affect the cellulose. It has been suggested that the excess of water might be removed by evaporation from the solution, after the cellulose is sufficiently treated. But this would require either too long a time at a low safe temperature or would compel the use of relatively expensive heat energy. If the temperature accidentally rose too high, the cellulose would be injured through attack by the overheated alkali solution.

I have found that the expensive, prolonged and somewhat risky heating step may be eliminated by squeezing out mechanically the alkali solution until the remainder carries approximately the right amount of water for the etherifying reaction. This operation at the same time carries away a proportionate amount of alkali in the solution, and would leave an insufficient amount in the cellulose mass if a proper precaution were not taken. I have discovered that this deficiency can be best avoided if a quantity of solid alkali be mixed into the mass of mercerized cellulose fibers shortly before the excess of solution is mechanically pressed out or removed.

I will now give one example of my invention, but it will be obvious that the steps may be varied so long as the principles outlined above are employed. 32 lbs., of dried cellulose are soaked or immersed in 576 lbs., of a 50% caustic soda solution for 72 hours at 18° C. After this treatment or mercerization with the solution of alkali, 16 lbs., of powdered caustic is mixed into the mass and the latter then pressed down to 144 lbs., the excess solution being thus squeezed out. This results in a very intimate mixture of cellulose with the right amounts of caustic soda and water for use in the subsequent etherifying reaction.

This mixture is charged into an autoclave with 120 lbs., of ethyl chloride, for instance. The autoclave is then heated for say twenty-four hours at temperatures between 90 and 170° C., the contents being agitated if desired.

The above example indicates one way of treating the cellulose with an excess of a solution of alkali. By excess I mean such a quantity of solution that the water therein exceeds the amount which should be present during the etherification. The excess of solution is removed cheaply, quickly, and safely by mechanical action, using any of the well known means of pressing out liquids from fibers, such as plunger presses or centrifugal devices. I have found it especially advantageous to prevent a deficiency of alkali by quickly admixing it prior to the squeezing out of the excess solution rather than after that operation.

Having thus described my invention, what I claim as new and desire to secure by Letters Patent is:

1. In the process of making cellulose ethers, the steps of treating cellulose with a solution of alkali, mixing therewith solid alkali and then removing sufficient of said solution from the mixture to leave the residue of alkali and solvent in the cellulose in proportion for etherification.

2. In the process of making cellulose ethers, the steps of soaking cellulose in an excess of an aqueous solution of caustic alkali mixing therewith powdered caustic alkali and then pressing out sufficient of said solution to leave the residue of alkali and water in the cellulose in proportion for etherification.

3. In the process of making cellulose ethers, the steps of soaking cellulose in a caustic soda solution until mercerized, then mixing powdered caustic soda therewith and finally pressing out the excess of said caustic soda solution.

4. In the process of making cellulose ethers, the steps of treating 32 parts of dried cellulose with 576 parts by weight of a 50% caustic soda solution for approximately seventy-two hours of approximately 18° C., then mixing therein 16 parts of powdered caustic soda, and finally pressing out caustic soda solution from the mass until the latter is reduced to 144 parts.

5. In the process of making cellulose ethers, the steps of treating cellulose with a solution of alkali, mixing therewith solid alkali, removing sufficient of said solution from the mixture to leave the residue of alkali and solvent in the cellulose in proportion for etherification, and etherifying the cellulose in the resulting mixture.

6. In the process of making cellulose ethers, the steps of soaking cellulose in an excess of an aqueous solution of caustic alkali, mixing therewith a powdered caustic alkali, then pressing out sufficient of said solution to leave the residue of alkali and water in the cellulose in proportion for etherification, and etherifying the cellulose in the resulting mixture.

7. In the process of making cellulose ethers, the steps of soaking cellulose in a caustic soda solution until mercerized, then mixing powdered caustic soda therewith, pressing out the excess of said caustic soda solution, and etherifying the cellulose in the resulting mixture.

8. In the process of making cellulose ethers, the steps of treating 32 parts of dried cellulose with 576 parts by weight of a 50% caustic soda solution for approximately seventy-two hours at approximately 18° C., then mixing therein 16 parts of powdered caustic soda, pressing out the caustic soda solution from the mass until the latter is reduced to 144 parts, and ethylating the cellulose in the resulting mixture.

Signed at Rochester, New York, this fourth day of June 1921.

JOHN M. DONOHUE.